Jan. 13, 1942.   G. H. ROCKWOOD, JR   2,269,603
MEASURING DEVICE
Filed Sept. 7, 1939
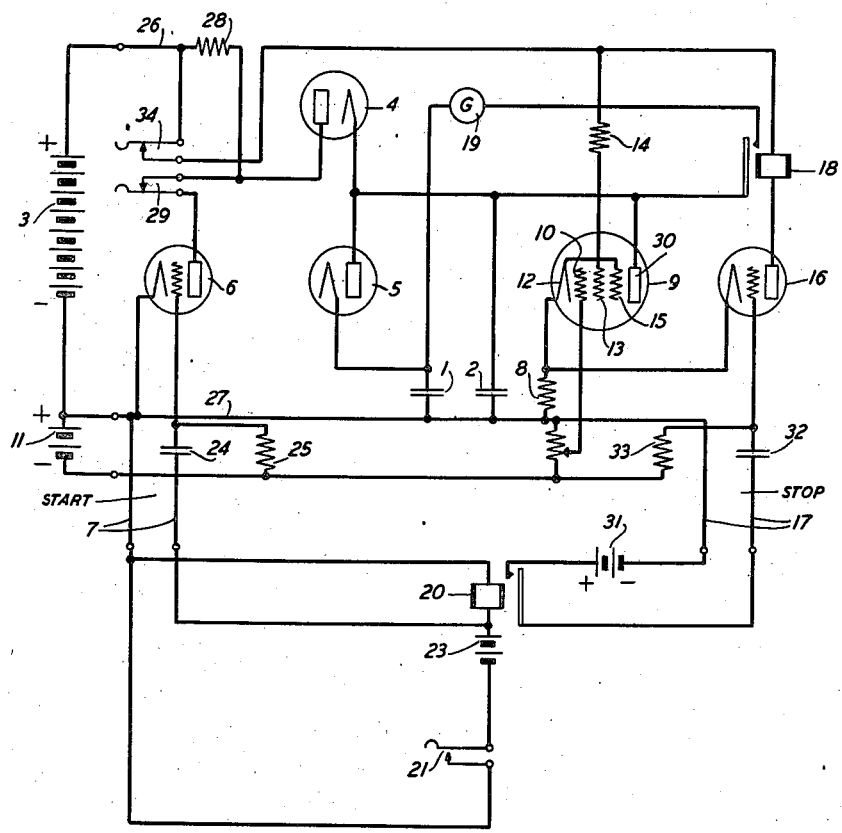
INVENTOR
G.H.ROCKWOOD, JR.
BY
ATTORNEY Patented Jan. 13, 1942

2,269,603

UNITED STATES PATENT OFFICE 2,269,603

MEASURING DEVICE

George H. Rockwood, Jr., Summit, N. J., assignor to Bell Telephone Laboratories, Incorporated, New York, N. Y., a corporation of New York Application September 7, 1939, Serial No. 293,777

6 Claims. (Cl. 175—183)

This invention relates to devices for measuring intervals of time.

An object of the invention is to obtain a greater degree of accuracy in the measurement of relatively small intervals of time and particularly in the measurement of the operating times of relays.

Another object of the invention is to obtain measurements which are unaffected by variations in the voltage of the source utilized for performing these measurements.

These and other objects of the invention are realized by means of a measuring system in which two condensers, which are normally connected to a common source of voltage, are maintained in a charged condition by said source until the beginning of the interval to be measured; in which both condensers are automatically disconnected from the charging source at the commencement of the interval, one of said condensers being isolated to retain its charge and the other being permitted to dissipate its charge at a constant rate through a space-discharge tube until the end of said interval; in which the space-discharge tube is rendered non-conducting at the termination of the interval to stop the discharge from said second condenser; and in which the charge remaining on said second condenser is compared with that on the first condenser by connecting both condensers through an indicating instrument to determine the time elapsed between the beginning and the end of said interval.

More specifically, this measuring system may be used to determine the operating time of a relay. At the instant energizing current is applied to the winding of the relay an impulse is produced which operates a gas-filled tube and causes the disconnection of the two condensers from the source of charging voltage. The first condenser, on being disconnected from the charging source, is completely isolated and retains its charge. The second condenser, however, being connected across the discharge path of a pentode tube, dissipates its charge through the tube at a constant rate. As soon as the relay operates, marking the termination of the interval being measured, an impulse is produced which operates a second gas-filled tube to render the pentode tube non-conducting, thus preventing any further dissipation of the charge on the second condenser. The operation of the second gas-filled tube also results in the energization of a relay which connects the two condensers in series with each other through a galvanometer. The difference in potential between the two condensers is directly proportional to the time required for operating the relay, and the current flowing through the galvanometer as a result of this potential difference deflects the needle to indicate the length of the time interval.

The drawing, which accompanies the detailed specification, discloses a measuring system embodying the features of this invention.

In this system the condensers 1 and 2 receive charges from the voltage source 3 and utilize these charges to measure an interval of time. The charging circuit over which current flows from the source 3 to the condensers 1 and 2 includes the discharge tubes 4 and 5, which may be either of the gas-filled or vacuum tupes. Normally the voltage of the source 3 is sufficient to cause the tubes 4 and 5 to conduct, permitting current to flow from the source 3 through the tubes to the condensers 1 and 2. Both condensers are charged, therefore, to a voltage which is substantially the same as the voltage of the source 3.

When it is desired to measure an interval of time, such as the operating time of a relay, the charging circuit for the condensers 1 and 2 is opened to mark the commencement of the interval. To obtain this opening of the charging circuit precisely at the instant the measured interval begins a gas-filled discharge tube 6 is connected across the charging circuit. If an impulse is delivered over the start circuit 7 at the instant the measured interval begins, the tube 6 fires and closes a low-impedance circuit across the charging circuit, shunting the tubes 4 and 5 and the condensers 1 and 2. This shunt causes the tubes 4 and 5 to become non-conducting instantly, terminating any further charging of the condensers.

The condenser 1 is isolated as soon as the tubes 4 and 5 cease to conduct; consequently this condenser retains the charge it has received from the source 3. The condenser 2, however, is connected through a resistance 8 across the anode and cathode terminals of the pentode discharge tube 9. The control grid 10 of the pentode tube is normally biased by the battery 11 with respect to the cathode 12 such that current is permitted to flow in the anode-cathode circuit of the tube. As soon, therefore, as the charging circuit of condenser 2 is disabled, the condenser 2 commences to discharge through the tube 9. This dissipation of the charge on the condenser 2 continues until the end of the interval of time that is being measured. The screen grid 13 of the tube 9 is connected through a resistance 14 to the positive terminal of the source 3, and the suppressor grid 15 is connected to the cathode 12. These electrodes serve in the well-known manner to control the discharge of the tube so that the anode current remains substantially constant and independent of the anode voltage.

In order to mark the termination of the measured interval a second gas-filled tube 16 is provided. If, at the end of the interval, an impulse is applied to the stop circuit 17, the tube 16 fires and modifies the bias of the pentode 9 to such an extent that the latter tube ceases to conduct, and the discharge of condenser 2 is terminated. The operation of the tube 16 also brings about the energization of a relay 18 which serves to connect the condensers 1 and 2 in series with each other and in circuit with an indicating galvanometer 19. Since the condenser 2 has discharged at a constant rate during the measured interval and since the condenser 1 has retained its original charge, the difference between the charges on these condensers is directly proportional to the duration of the interval. Hence the galvanometer 19 may be calibrated to read directly the measured interval in units of time.

This system may be used for measuring the time elapsed between any two consecutive events. It is particularly suitable for obtaining accurate measurements of small intervals, such as those varying from fractions of a second to several seconds. However, the invention is not limited to any particular range of intervals; and it will be obvious that the length of the intervals may be extended by selecting the proper values for the elements used in the system.

One useful application for this system is the measurement of relay operating times. For example, the time required for the relay 20 to close its contacts after the closure of its energizing circuit may be obtained with a high degree of accuracy. The energizing circuit of the relay 20 is connected in parallel with the start circuit 7 so that a starting impulse is transmitted to the tube 6 the instant the relay 20 begins to energize. Also the contacts of the relay 20 are connected in series with the stop circuit 17 to transmit an impulse to the tube 16 the instant relay 20 closes these contacts.

A detailed description will now be given of the measuring system, assuming that it is desired to determine the operating time of the relay 20. As explained above the condensers 1 and 2 are normally maintained in a charged condition by the source 3. The terminals of condenser 2 are connected across the anode and cathode terminals of the discharge tube 9 through the resistance 8, and the bias of the control grid 10, supplied by battery 11, is such that the tube is conductive in response to the anode voltage applied thereto as a result of the charge on the condenser 2 during the measuring operation. The impedance of the tube, however, prevents it from shunting the condenser 2 unduly, and the charge on the condenser is maintained by the flow of charging current of the source 3 through the discharge tube 4.

To initiate the measuring operation the key 21 is operated to close an obvious circuit for energizing the relay 20. At the same instant a circuit is closed from the positive pole of the battery 23 in the energizing circuit of relay 20 over one side of the start circuit 7 through the condenser 24 to the control grid of the gas-filled tube 6. The other pole of the battery 23 is connected over the other side of the start circuit 7 to the cathode of tube 6. The control electrode of the tube 6 is normally biased by a circuit from the negative pole of battery 11 through the resistance 25 to prevent operation of the tube. When, however, the battery 23 is connected to the control electrode of the tube 6 as above noted, the tube ionizes and closes a relatively low impedance shunt across the conductors 26 and 27 of the condenser charging circuit. This shunt may be traced from the positive pole of battery 3, conductor 26, resistance 28, key contacts 29, anode and cathode of the tube 6, conductor 27 to the negative pole of battery 3. This shunt across the charging circuit causes the tubes 4 and 5 to quench instantly, terminating the flow of charging current to condensers 1 and 2. The tube 6 being of the gas-filled type, continues to conduct, independently of the start circuit 7, to maintain the shunt across the charging circuit.

The quenching of the tubes 4 and 5 isolates the condenser 1, and this condenser retains throughout the measuring interval the charge it derived from the source 3. The condenser 2, however, commences to dissipate its charge the instant the tubes 4 and 5 quench, which is the same instant that energizing current begins to flow in the winding of the relay 20. The circuit through which the condenser 2 dissipates its charge may be traced from the upper terminal of the condenser to the anode 30 of the tube 9, thence to the cathode 12 and resistance 8 to the other terminal of the condenser. As discharge current flows from the condenser 2 through the anode circuit of the tube, the voltage impressed across the anode and cathode of the tube gradually decreases. It is, however, a well-known characteristic of these tubes that the current flowing in the anode circuit is substantially independent of variations in the anode voltage. Therefore, the charge on condenser 2 is dissipated at a constant rate throughout the measured interval.

When the relay 20 closes its front contacts to terminate the interval being measured, a circuit is closed from the positive pole of battery 31, contacts of relay 20 over one conductor of the stop circuit 17 through the condenser 32 to the control electrode of the gas-filled tube 16. The other pole of battery 31 is connected over the other side of the stop circuit 17 through resistance 8 to the cathode of tube 16. Battery 31 delivers an impulse to the control electrode of the tube 16, which is normally biased by the negative pole of battery 11 through resistance 33, causing the tube to ionize. When tube 16 ionizes a circuit is closed for the flow of current from the positive pole of battery 3 through the key contacts 34, winding of relay 18, anode and cathode of tube 16 through the resistance 8 thence over conductor 27 to the negative pole of battery 3. Current flowing through the resistance 8 produces a voltage drop which acts to bias the control electrode 10 of the tube 9 sufficiently to render the tube non-conducting. Thus the dissipation of the charge on condenser 2 ceases, marking the end of the measured interval.

The relay 18 also operates in the discharge circuit of tube 16 and closes a circuit for connecting the two condensers 1 and 2 in series with each other and in series with the indicating galvanometer 19. This circuit may be traced from the upper terminal of condenser 2 to the contacts of relay 18, galvanometer 19 through the condenser 1 to the lower terminal of condenser 2. Since condenser 1 possesses its full original charge and since condenser 2 has dissipated its charge at a constant rate during the interval undergoing measurement, the difference between the charge on condenser 1 and the residue on condenser 2 is directly proportional to the length of the interval. When, therefore, these condensers are connected to the galvanometer 19, the current flowing through the winding of the galvanometer as a result of the difference in the charges on the condensers causes the indicating needle of the instrument to move over the scale by an amount which represents in time units the length of the interval.

After the reading of the galvanometer has been taken the system may be restored to normal by releasing the key 21 and by opening the key contacts 29 and 34. The release of key 21 releases relay 20. The opening of contacts 29 severs the discharge circuit of tube 6, and this tube quenches to remove the shunt from the charging circuit. The opening of contacts 34 quenches the tube 16, permitting the relay 18 to release. The shunt having been removed from the charging circuit, tubes 4 and 5 reionize, and the condensers 1 and 2 are again charged in readiness for the next measuring operation.

It will be noted that this method of measuring time is not subject to error due to variations in the voltage of the source 3. If the voltage of source 3 varies above or below a definite value, the charges received by condensers 1 and 2 vary likewise, and the difference between the charges on these condensers at the end of the measured interval depends only on the length of the interval and is independent of any variations in the source 3.

What is claimed is:

1. The combination in a system for measuring intervals of time of a first condenser and a second condenser, a source of voltage for charging both of said condensers, a circuit for connecting said source to said condensers, means effective at the commencement of the interval to be measured for disconnecting said source from both of said condensers to terminate the charging thereof and to isolate said first condenser to prevent it from changing its charge during said interval, means effective upon the disconnection of said source from said condensers for causing said second condenser to discharge at a constant rate throughout said interval, means effective at the end of said interval for terminating the discharge of said second condenser, and means controlled by the charges on said condensers for determining the length of said time interval.

2. The combination in a system for measuring intervals of time of a first condenser and a second condenser, a source of voltage for charging both of said condensers, a circuit including a current-conducting device for connecting said source to said condensers, means effective at the beginning of the interval to be measured for disabling said current-conducting device to terminate the flow of charging current from said source to said condensers and to isolate said first condenser from other parts of the system to prevent it from dissipating its charge during said interval, means effective as soon as said current-conducting device is disabled for dissipating the charge on said second condenser at a constant rate, means effective at the end of said interval for terminating the discharge of said second condenser, and means depending upon the charges on said condensers for determining the length of said interval.

3. In a measuring system, a first condenser and a second condenser, a source for charging both of said condensers, a circuit including a space-discharge device for connecting said source to said condensers, means effective at the commencement of an interval of time for disabling said discharge device to prevent the further flow of charging current to said condensers, a second space-discharge device for dissipating the charge on said second condenser throughout the duration of said interval, means effective at the end of said interval for disabling said second discharge device to terminate the discharge from said second condenser, and indicating means for comparing the charges on said condensers to indicate the length of said interval.

4. The combination in a measuring system of a first condenser and a second condenser, a source for charging both of said condensers, a circuit for connecting said source to said condensers, means effective at the commencement of an interval of time for disconnecting said source from both of said condensers to terminate the charging thereof, the first of said condensers being isolated thereby to retain the charge it has derived from said source, a space-discharge tube having its discharge electrodes connected to the terminals of said second condenser to dissipate the charge thereon, control electrodes for said tube for causing the discharge current to flow at a constant rate during the said interval of time, means effective at the end of said interval for rendering said discharge tube non-conducting to terminate the discharge of said second condenser, and means controlled by the charges on said condensers for determining the length of said time interval.

5. The combination in a measuring system of a first condenser and a second condenser, a source for charging both of said condensers, a circuit for connecting said source to said condensers, means effective at the commencement of an interval of time for disconnecting said source from both of said condensers to terminate the charging thereof, the first of said condensers being isolated thereby to retain the charge it has derived from said source, a space-discharge tube having its discharge electrodes connected to the terminals of said second condenser to dissipate the charge thereon, control electrodes for said tube for causing the discharge current to flow at a constant rate during the said interval of time, means effective at the end of said interval for quenching the discharge of said tube to terminate the dissipation of the charge on said second condenser, a measuring device, and means also effective at the termination of said interval for connecting said condensers in series with each other and said measuring device to determine the length of said time interval.

6. The combination in a measuring system of a first condenser and a second condenser, a source of voltage for charging both of said condensers, a circuit for connecting said source to said condensers, a relay having an undetermined operating time interval, an energizing circuit for said relay, means for closing said energizing circuit to commence the operating interval of said relay, a discharge tube responsive to the closure of said energizing circuit for causing the disconnection of said source of voltage from said condensers to terminate the flow of charging current to said condensers, means for discharging said second condenser at a constant rate throughout the operating interval of said relay, a second discharge tube, a circuit for operating said second tube in response to the operation of said relay at the end of said operating interval, means controlled by said second tube for terminating the discharge of said second condenser, and means controlled jointly by the charges on said condensers for determining the length of said operating interval.

GEORGE H. ROCKWOOD, Jr.